United States Patent
Landes et al.

(10) Patent No.: US 7,080,705 B2
(45) Date of Patent: *Jul. 25, 2006

(54) APPARATUS AND METHOD FOR DATA COMMUNICATION

(75) Inventors: James W. Landes, East Peoria, IL (US); Scott E. Nicholson, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/067,272

(22) Filed: Feb. 28, 2005

(65) Prior Publication Data

US 2005/0139405 A1    Jun. 30, 2005

Related U.S. Application Data

(63) Continuation of application No. 09/977,726, filed on Oct. 15, 2001, now Pat. No. 6,860,351.

(51) Int. Cl.
*B60K 31/00* (2006.01)

(52) U.S. Cl. .................... 180/170; 180/171; 701/92; 701/93; 701/97

(58) Field of Classification Search ............... 180/170, 180/171, 178, 179; 701/97, 98, 93, 92, 24
See application file for complete search history.

(56) References Cited

U.S. PATENT DOCUMENTS

| 4,120,373 | A | 10/1978 | Fleischer |
| 5,054,570 | A | 10/1991 | Naito et al. |
| 5,552,985 | A | 9/1996 | Hori |
| 5,594,645 | A | 1/1997 | Nishimura et al. |
| 5,695,020 | A | 12/1997 | Nishimura |
| 6,076,622 | A | 6/2000 | Chakraborty et al. |
| 6,226,588 | B1 | 5/2001 | Teramura et al. |

OTHER PUBLICATIONS

Troubleshooting & Service Manual—VOTS 0030, EVT-300, Oct., 2000, Eaton Vorad Collision Warning Systems (38 pages).

Driver Reference Manual, VODR-0030, EVT-300, Feb., 2001, Eaton Vorad Collision Warning Systems (35 pages).

*Primary Examiner*—Christopher P. Ellis
*Assistant Examiner*—Brian Swenson
(74) *Attorney, Agent, or Firm*—Finnegan, Henderson, Farabow, Garrett LLP

(57) ABSTRACT

An electronically controlled compression ignition engine is connected with an advanced cruise control system. The advanced cruise control system is capable of measuring distance to a vehicle or other object in front of equipment that is power by the compression ignition engine. Signals produced by the advanced cruise control system, at least in part, are used to determine the power output of the engine. In the event that the electronically controlled engine receives no signals from the advanced cruise control system, the electronic control may disengage or disable the advanced cruise control.

16 Claims, 2 Drawing Sheets

APPARATUS AND METHOD FOR DATA COMMUNICATION

This application is a continuation of U.S. application Ser. No. 09/977,726, filed Oct. 15, 2001, now U.S. Pat. No. 6,860,351, the subject matter of which is incorporated herein by reference.

TECHNICAL FIELD

The present invention relates generally to the field of on-highway trucks and more particularly to a data communication link for use with electronically controlled on-highway truck engines.

BACKGROUND

In the past, many on-highway trucks used mechanically controlled engines, which had mechanical governors and were mechanically connected with a throttle input. While these engines worked well, there were limitations in the variety of ways that the engine could be controlled. For example, timing and duration of fuel injection was typically controlled by the physical configuration of a cam shaft and the specific fuel injectors used on the engine. The timing and duration of fuel injection could be changed, but generally this required changing the mechanical components of the engine, such as a fuel injector or the camshaft. Electronically controlled engines greatly increased the flexibility of the fuel injection control for such engines. Using an electronically controlled fuel injector such as a HEUI fuel injector manufactured by the assignee of the present application, the controller can vary the timing and duration of fuel injected into the individual cylinders without changing the mechanical configuration of the engine. This permits the control system to vary timing and duration for different objectives, even while the engine is operating. For example, a control strategy could be developed to improve fuel economy while maintaining or improving emissions.

Other advantages of electronically controlled engines readily became apparent. Because the electronic control module could receive inputs from sensors and, to some extent, send signals to actuators on the vehicle and transmission, the engine's performance and operating characteristics could be adjusted based on sensed vehicle or transmission conditions. Many issued patents show examples of such integration. For example, U.S. Pat. No. 4,914,597, varies the engine power output based on whether cruise control is engaged or not. Another example is U.S. Pat. No. 4,493,303, issued to Mack Trucks Inc., varies the engine power output based on the transmission gear that is currently being used—the control allows the engine to produce greater power when the transmission is in one of the top two gears.

Still another example of the ability of electronically controlled engines to use signals from other systems is the use of distance sensing devices to influence the operations of the engine's cruise control system. As is known to those skilled in the art, conventional cruise control systems use various operator inputs to store a target cruise control vehicle speed, which is then typically used by the engine controller, along with other signals including vehicle speed, to calculate and generate a fuel command to minimize the error between the target cruise control vehicle speed and the actual vehicle speed. In this manner, the cruise control system controls the engine speed to maintain or control vehicle speed to the target speed. Advanced cruise control systems add additional capabilities to the conventional cruise control system. Typically an advanced cruise control system utilizes an electromagnetic beam, such as a laser beam, a microwave radar beam, or a video image, to determine the inter-vehicle distance and closure rate between the host vehicle and one or more forward vehicles. This information may then be used by the engine controller to automatically adapt to the traffic flow and "track" or follow the forward vehicle at a desired following distance selected by the operator. Distance and closure rate information may also be used to warn the vehicle operator of a potentially hazardous situation such as following the forward vehicle too closely for the current vehicle speed or approaching the forward vehicle or another object too rapidly such that a collision may occur. An example of an advanced cruise control system is disclosed in U.S. Pat. No. 6,076,622 issued to Eaton VORAD Technologies, LLC.

Oftentimes the advanced cruise control systems and engine control systems are manufactured by different companies. It is therefore important to have a standard communication format to permit these devices to communicate with various engine manufacturers' engine controllers. Standards, recommendations, guidelines, specifications, and the like, hereinafter collectively referred to as standards, are continually developed and published by various organizations. These standards designate component characteristics, testing procedures, communications formats, standards and methods of operation. Such organizations include the International Standards Organization (ISO), the Society of Automotive Engineers (SAE), and the Institute for Electrical and Electronics Engineers (IEEE), among numerous others. Often standards published by one organization will have corresponding designations in other organizations or may be a conglomeration of various other standards. Standards of particular interest in providing electronic engine control for vehicles such as heavy-duty tractor semi-trailer vehicles are published by the SAE, one of which is designated SAE J1939. As is known, ISO 11898 is generally similar to and compatible with SAE J1939.

The J1939 standards define various control modes for electronically controlled engines including a normal mode, a cruise control mode, a torque control mode, and a speed and torque limit control mode. In normal mode, engine fueling is controlled based primarily on input received from the vehicle operator, typically via a throttle pedal. Of course a number of other factors influence the actual determination of engine fueling as described in greater detail below. In a standard cruise control mode, engine fueling is controlled to maintain a substantially constant engine speed. In torque control mode, a substantially constant engine output torque (as a percentage of total available torque) is effected regardless of engine speed and vehicle speed. Speed and torque limit control mode imposes an upper limit on engine speed and/or engine output torque. The override modes may be used to override the current operating mode and command the engine to a particular engine speed or engine output torque. The control mode is based on current operating conditions and commands received by the engine controller which may be generated by various other vehicle systems and subsystems or by the vehicle operator. A more detailed description of the modes of operation may be found in the J1939 specifications, the disclosures of which are hereby incorporated by reference in their entirety. Other, related standards utilized in electronic engine control and communication include SAE J1587, SAE J1708, and SAE J1843, the disclosures of which are also hereby incorporated by reference in their entirety.

As will be readily apparent to those skilled in the art, it is important for the engine controller to receive accurate data from the advanced cruise control system so that the engine controller, and particularly the cruise control, responds to vehicles or other detected obstacles. Although the data bus communications standards set forth in J1939 work satisfactorily, there are instances when too much data or noise on the bus, among other reasons, prevents the engine controller from receiving a particular data transmission, or causes the data to be corrupted. In prior art systems, the engine controller will simply disable the advanced cruise control system once an invalid data communication signal is received and causes the system to remain disabled until the engine controller has been re-initialized, which generally requires that the operator turn the ignition switch off, then re-start the engine. Although this system does help insure that the engine controller receives valid data from the advance cruise control system, it is inconvenient for the operator to have to re-initialize the controller for every invalid data transmission. It would be preferable to have a control system that overcomes these and other disadvantages associated with the prior art.

SUMMARY OF THE INVENTION

In one aspect of the present invention, a compression ignition engine includes an electronic controller that produces fuel delivery commands to control power output of said engine. The electronic controller is connected with an advanced cruise control system. The electronic controller receives communication signals produced by the advanced cruise control system, determines whether there has been a communication fault and responsively affects operation of the advanced cruise control system.

DETAILED DESCRIPTION

The following is a detailed description of the best mode embodiment of the present invention, with sufficient detail to permit someone skilled in the art to make and use the claimed invention. The present invention, however, is not limited to the embodiment disclosed and described herein. To the contrary, the present invention may include all those alternative embodiments and equivalents that fall within the scope of the present invention as defined by the appended claims.

Figure 1:
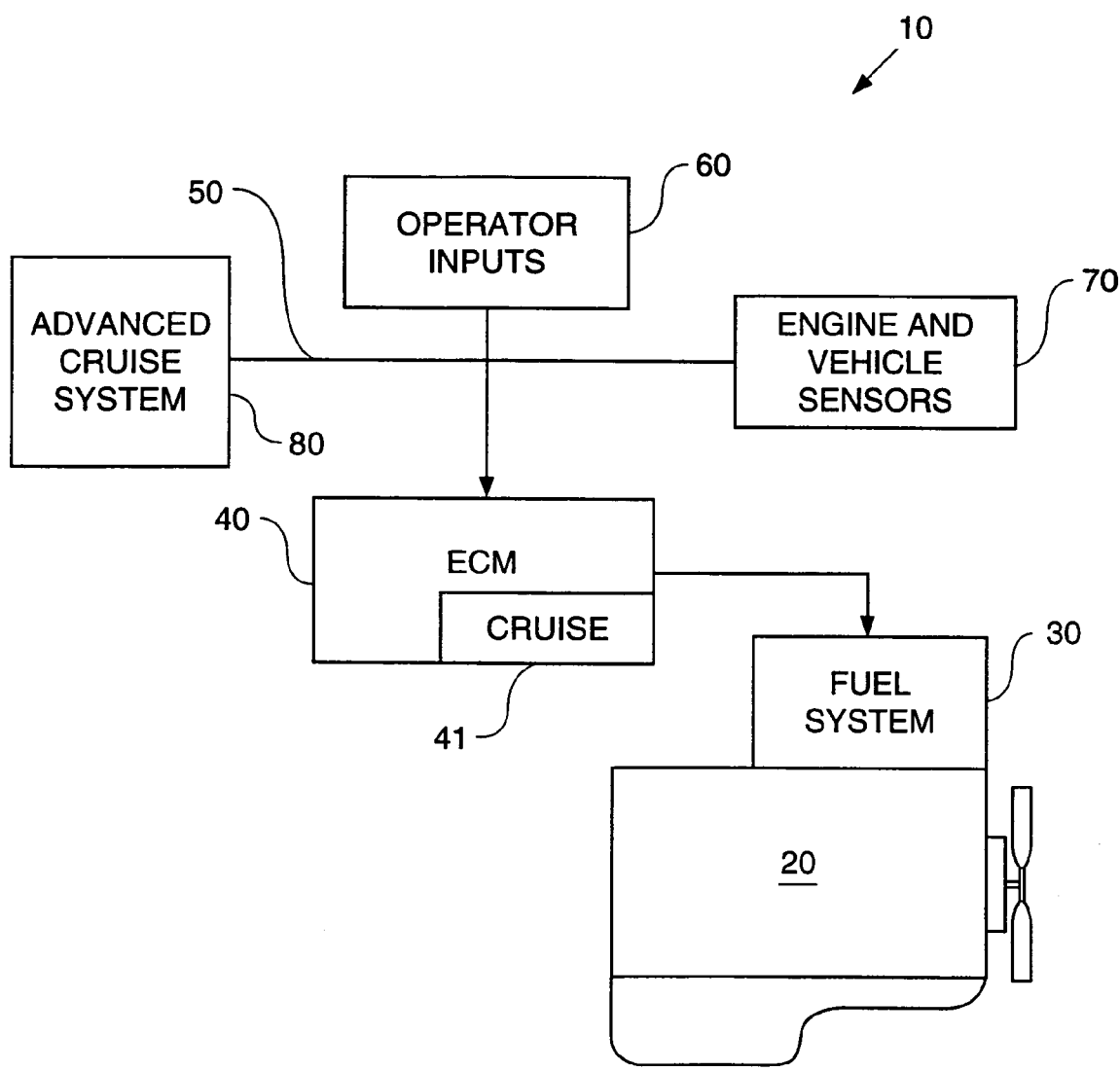
FIG. 1 depicts a system level block diagram of an exemplary system incorporating an embodiment of the present invention.

Referring first to FIG. 1, a block diagram of a control system 10 for use with a compression ignition engine 20 is shown. As shown in the drawing, the compression ignition engine 20 preferably includes a fuel system 30 which in a preferred embodiment includes a fuel injector associated with each of the engine cylinders. Although the fuel system of the preferred embodiment includes fuel injectors, alternative embodiments may include a carburetor or other fuel delivery mechanism. The fuel system 30 is preferably electrically connected with an electronic control module ("ECM") 40 that delivers fuel delivery commands to each of the fuel injectors thereby causing a commanded quantity of fuel to be injected into the cylinders at a commanded time.

The ECM 40 is preferably connected with a data bus 50, which in a preferred embodiment is governed by the Society of Automotive Engineers (SAE) standard J1939. Although the preferred embodiment utilizes a data bus with the J1939 standard, other data bus standards could be used in other applications without deviating from the scope of the present invention. For example, in off-highway applications, particularly in mining equipment or the like, the data bus might comply with a different standard or might be a data bus specific to the manufacturer of the equipment. Included within the ECM 40 are software programs and hardware necessary to run the engine 20 and other programs to perform control of various vehicle functions and accessories, including program control for a cruise control feature 41.

Various operator inputs 60 are preferably in electrical communication with the ECM 40 over the data bus 50. These operator inputs are typical inputs for the particular application, which in on-highway trucks include inputs well known to those skilled in the art including a throttle input and cruise control inputs including an on/off/resume switch and a set switch. Other operator inputs may also be included.

Vehicle, engine and transmission sensors 70 are also preferably connected with the data bus 50 and are in electrical communication with the ECM 40. Typically, these sensors may include an engine speed sensor, a vehicle speed sensor, a transmission gear sensor among other sensors.

Also connected with the data bus 50 is an advanced cruise control system 80. These systems are well known in the art and are available from several different manufactures. On such system is manufactured by Eaton VORAD Technologies, and is known as EVT-300 with SMARTCRUISE®. Another example of such a system is disclosed in U.S. Pat. No. 6,076,622 assigned to Eaton VORAD Technologies, L.L.C., the disclosure of which is incorporated herein by reference. Any one of these systems can be used in connection with an embodiment of the present invention. As is known to those skilled in the art, the advanced cruise control system 80 communicates with the ECM 40 over the data bus 50 and preferably communicates data or instructions to the cruise control feature 41, which are then used to control fuel delivery to the engine 20, or control command signals issued to a compression brake (not shown). In a preferred embodiment, the advanced cruise control system 80, produces a periodic data output onto the data bus 50, which in a preferred embodiment occurs about every 100 ms. Those skilled in the art will recognize that other periodic rates could readily and easily be used. Although the advanced cruise control system 80 of a preferred embodiment produces periodic signals, in other embodiments different communications protocols and formats may be used without deviating from the scope of the present invention as defined by the appended claims. For example, the communications may be interrupt driven, or have hand-shaking whereby the ECM 40 prompts the advanced cruise control system 80 for data. Still other protocols and formats are know to those skilled in the art and could be used in connection with the present invention.

Figure 2:
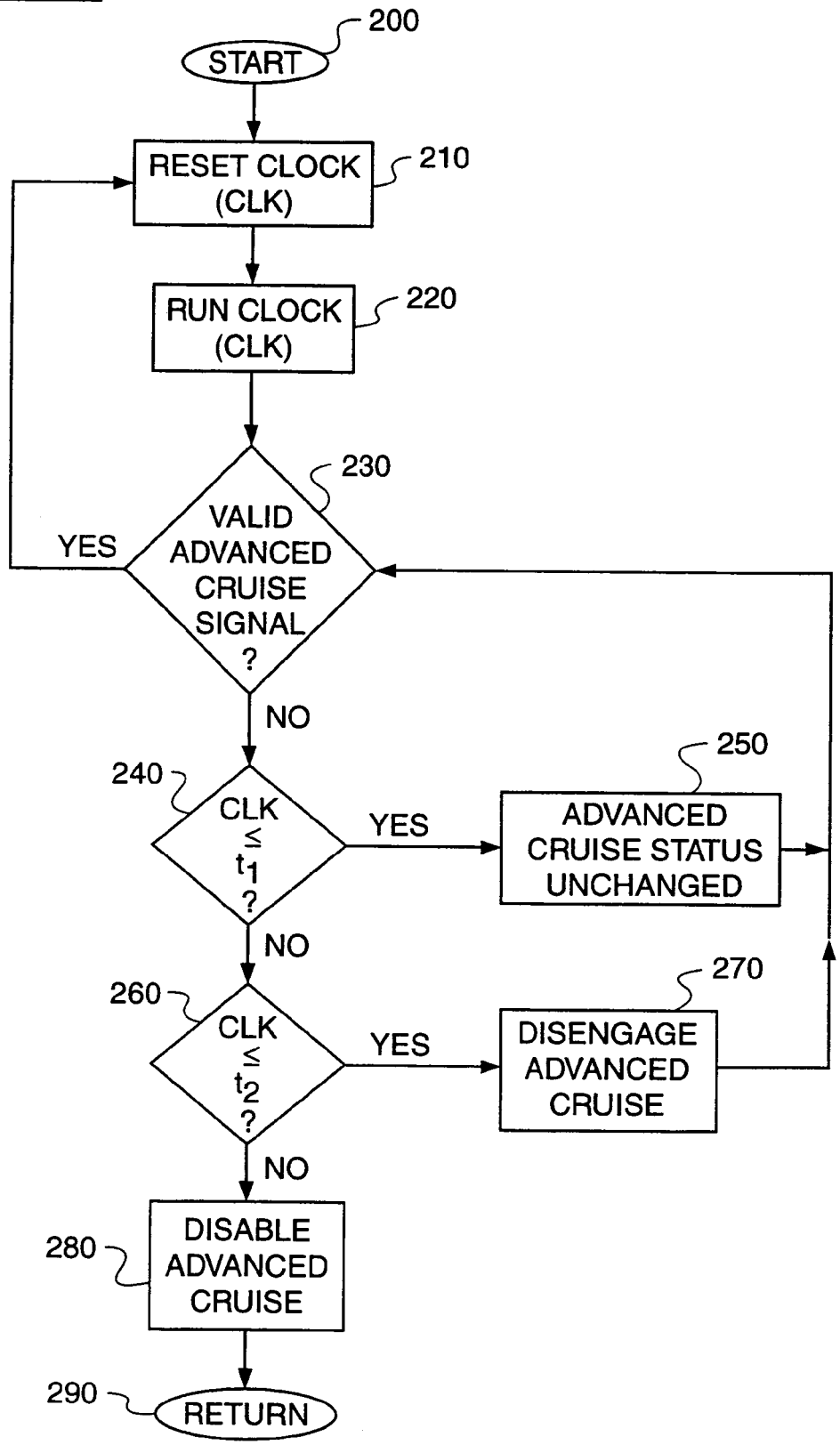
FIG. 2 is an embodiment of software control used in connection with an embodiment of the present invention.

Referring now to FIG. 2, software control for an aspect of the data communications employed in a preferred embodiment of the present invention is shown. Those skilled in the art will recognize that the flowchart of FIG. 2 is a description of one embodiment of computer control used in connection with the invention and that other flowcharts, with varying degrees of detail, could be used to describe the same software program. Still other algorithms and computer programs could be developed that perform the same or equivalent functions, but would be represented by a different flowchart. The flowchart depicted in FIG. 2 is therefore exemplary of an embodiment of the control used in connection with an aspect of the present invention. Those skilled in the art could readily and easily write appropriate software control programs from the flowchart of FIG. 2 using the programming language associated with the specific microprocessor or microcontroller used in the ECM 40.

Program control begins in block 200 and passes to block 210. In block 210, program control resets a clock variable (CLK) to zero. Program control then passes to block 220.

In block 220, program control starts the variable CLK, which thereafter keeps track of the elapsed time. In conjunction with block 230 as described following, the variable CLK keeps track of the time elapsed since a valid communications signal has been received from the advanced cruise control system 80. Although the flowchart shows the CLK as being reset to zero each time program control passes through block 210, in other embodiments, the current time reading of the system clock or other clock could be stored in the variable CLK in block 220, which could then be compared to the system clock to determine an amount of elapsed time. Thus, the flowchart is meant to generically depict one of any number of specific ways of determining an elapsed time.

In block 230, program control causes the ECM 40 to assess whether a communication signal is received from the advanced cruise control system 80 over the data bus 50 and whether the communication signal is a valid signal. Those skilled in the art will recognize that there are many different kinds of signal validation techniques for digital communications such as those transmitted over the preferred data bus 50. Examples of such validation techniques could include checksum, CRC, MNP or CCITT V.42 among other techniques, any of which could be used to verify that the transmitted signal has not been compromised by noise on the data bus 50, data collisions that may occur when two different devices attempt to transmit data on the bus at almost the same time, or other known causes of distorting the data. If the communication signal is received and is a valid signal, then program control returns to block 210. As can be seen from the flowchart, so long as the communication signal is received and valid, program control for this subroutine of the overall ECM 40 program control will continue to loop through blocks 210, 220 and 230. Of course, those skilled in the art will recognize that the microprocessor is continuing to perform other functions in between the periods when various aspects to the present routine are being performed. In block 230, if the communication signal is not received or is invalid, then program control passes to block 240.

In block 240, program control causes the elapsed time stored in the variable CLK to be compared with a predetermined value stored in a variable t1. In a preferred embodiment t1 is 500 ms, although other values could readily and easily be used. If the CLK value is less than the value t1, then program control passes to block 250, otherwise program control passes to block 260.

In block 250, the status of the advanced cruise control system 80 remains unchanged. That is, if the advanced cruise control system 80 was engaged, then so long as the CLK value is less than the value stored in t1 the advanced cruise control system will remain engaged. Thus, if the ECM 40 receives only a single invalid communication signal (or several invalid communication signals so long as the total number do not exceed the time period t1), a preferred embodiment of the invention will not disable the advanced cruise control system. Program control passes from block 250 to block 230, where the ECM 40 again determines whether there is a valid communication signal.

Returning to block 240, if the CLK value is greater than t1, then program control passes to block 260. In block 260, program control compares the CLK variable to a second value t2. In a preferred embodiment, t2 is approximately 3550 ms, although other values could readily and easily be used in other embodiments or systems. If no valid communication signal has been received while the CLK value is greater than t1, but less than or equal to t2, then program control passes to block 270 and the ECM 40 disengages the advanced cruise control feature. The term disengaged is used here to mean that the advanced cruise control no longer actively controls fuel delivery nor does it control activation of the compression brake. The operator can re-engage the advanced cruise control without having to re-initializing the ECM 40, (which would require for example stopping the truck, turning off the engine 20 and restarting the engine 20). Instead, to re-engage the advanced cruise control feature, the operator will manipulate at least one of the operator inputs; in a preferred embodiment the operator will press one of the set or resume cruise control inputs. If, in block 260, the CLK value exceeds the second value t2, then program control passes to block 280.

In block 280, the ECM disables the advanced cruise control feature because the absence of a valid signal between the advanced cruise control system 80 and the ECM 40 generally indicates that there is a communication failure or a serious defect in the communications between those devices. In a preferred embodiment, the operator will be required to re-initialize the ECM 40, preferably by stopping the truck, turning off the engine 20 and restarting the engine 20. Also in a preferred embodiment, if the operator manipulates the cruise control inputs once the ECM 40 has disabled the advanced cruise control system 80, the ECM 40 will cause the cruise control feature 41 to control the engine without using the advanced features of the system 80.

INDUSTRIAL APPLICABILITY

In an embodiment of the present invention, an ECM 40 is in electrical communication with an advanced cruise control system 80 over a data bus 50. The advanced cruise control system 80 preferably includes a radar or other distance sensing device that senses the presence of vehicles or other objects in front of the truck and the distance that those vehicles or objects are in front of the truck. The advanced cruise control system also includes control and communication circuitry to calculate the closing rate between the truck and the vehicle and communicate that information in communication signals to the ECM 40.

By using an embodiment of the present invention, the ECM 40 will allow the advanced cruise control to continue operating for communication errors less than the time t1. Thus, a single isolated communication error will not cause the system to disengage or be disabled. If the communication error continues for a time greater that t1 but less than t2, then the ECM 40 recognizes a communication error and disengages the advanced cruise control system 80. If the communication error continues for a time greater than t2, then a communication failure likely exists, for example a bad connection between components or faulty wiring, and the ECM 40 disables the advanced cruise control system 80.

The invention claimed is:

1. An engine comprising:
   an electronic controller, said electronic controller producing fuel delivery commands to control power output of said engine, said electronic controller including a cruise control mode; and
   an advanced cruise control system connected with said electronic controller and producing communication signals,
   wherein said electronic controller receives said communication signals and calculates a fuel delivery command based, at least in part, on said communication signals at least when said electronic controller is in an advanced cruise control mode,
   wherein said electronic controller disengages said advanced cruise control mode in response to receiving no valid communication signal from said advanced cruise control system for greater than a first period of time, and
   wherein the absence of a valid communication signal for the first period of time is indicative of a signal fault or failure between the advanced cruise control system and the electronic controller.

2. The compression ignition engine of claim 1, wherein said electronic controller disables said advanced cruise control mode in response to receiving no valid communication signal for greater than a second period of time.

3. The engine of claim 1, wherein said first period of time is less than about 500 milliseconds.

4. The engine of claim 2, wherein said second period of time is less than about 3500 milliseconds.

5. The engine of claim 1, wherein said first period of time is about 500 milliseconds.

6. The of claim 2, wherein said second period of time is about 3500 milliseconds.

7. The engine of claim 1, wherein said electronic controller re-engages said advanced cruise control system in response to one or more operator cruise control inputs.

8. The of claim 7, wherein said operator cruise control inputs include one of a cruise control resume switch and a set switch.

9. The of claim 2, wherein said electronic controller re-enables said advanced cruise control in response to operator re-initialization of the electronic controller.

10. The engine of claim 9, wherein said operator re-initialization includes turning off the engine and turning it back on.

11. A method of controlling an engine equipped with an electronic controller and an advanced cruise control system, said method comprising:
    receiving communication signals from said advanced cruise control system; and
    disengaging said advanced cruise control system as a function of not receiving one or more valid communication signals from said advanced cruise control system for a first time period,
    wherein the absence of a valid communication signal for the first period of time is indicative of a signal fault or failure between the advanced cruise control system and the electronic controller.

12. The method of claim 11, further comprising:
    disabling said advanced cruise control system as a function of not receiving one or more valid communication signals for a second period of time.

13. The method of claim 11, further comprising:
    re-engaging said advanced cruise control after said step of disengaging, in response to one or more operator cruise control inputs.

14. The method of claim 12, further comprising:
    re-enabling said advanced cruise control in response to an operator turning off the engine and turning it back on.

15. The method of claim 13, wherein said operator cruise control inputs include a cruise control resume switch.

16. The method of claim 12, further comprising:
    engaging cruise control, after said step of disabling, in response to one or more operator cruise control inputs.

* * * * *